United States Patent
Hornung et al.

[11] Patent Number: 5,826,947
[45] Date of Patent: Oct. 27, 1998

[54] FOLD-OUT CHUTE EXTENSION FOR A SHUTTLE DUMPING TRANSPORT VEHICLE FOR HARVESTED COTTON

[75] Inventors: Donald F. Hornung, Dodge City; Thomas A. Klenke, Spearville, both of Kans.

[73] Assignee: Crust Buster/Speed King, Inc., Dodge City, Kans.

[21] Appl. No.: 833,936

[22] Filed: Apr. 10, 1997

[51] Int. Cl.⁶ .............................. B60P 01/16; B60P 01/36
[52] U.S. Cl. ................. 298/7; 298/18; 414/491; 414/528
[58] Field of Search .................... 298/7, 11, 18, 298/23 C; 414/491, 528

[56] References Cited

U.S. PATENT DOCUMENTS

| | | |
|---|---|---|
| 1,755,120 | 4/1930 | Kerr . |
| 3,179,305 | 4/1965 | Wiens .................................... 222/288 |
| 3,629,890 | 12/1971 | Harris ...................................... 15/3.11 |
| 3,937,502 | 2/1976 | Gay ......................................... 298/11 |
| 4,034,716 | 7/1977 | Fleming .................................. 119/82 |
| 4,068,891 | 1/1978 | Herbst ....................................... 298/7 |
| 4,078,685 | 3/1978 | Corbin et al. . |
| 4,148,527 | 4/1979 | Steele ..................................... 298/10 |
| 4,430,038 | 2/1984 | Rempel et al. ........................ 414/346 |
| 4,458,588 | 7/1984 | Steele ..................................... 100/100 |
| 4,494,904 | 1/1985 | Hill et al. .............................. 414/491 |
| 4,662,160 | 5/1987 | Hubbard et al. ........................ 56/16.6 |
| 5,103,623 | 4/1992 | Herrett ...................................... 56/14.7 |
| 5,380,142 | 1/1995 | Hornung et al. ........................ 414/491 |
| 5,601,486 | 2/1997 | Schlueter .............................. 298/11 X |

FOREIGN PATENT DOCUMENTS 260788.00  3/1968  Austria .

*Primary Examiner*—Janice L. Krizek
*Attorney, Agent, or Firm*—W. Bruce Day

[57] ABSTRACT

A vehicle for transporting and dumping loads of particulate material comprising a vehicle frame having spaced, ground engaging wheels extending therefrom, and angularly upstanding spaced frame members projecting upward from the vehicle frame; a dump basket operative to contain the loads of particulate material therein, the dump basket situated between the spaced frame members and having spaced end walls, a first side wall, and a dump side wall, the spaced end walls, the first side wall and the dump side walls each having respective upper edges, the respective junctures of the upper edges forming spaced, upper corners, the dump basket having hinge connections to the frame members at the upper corners of the upper edges of the end walls and the dump side wall for upward rotation, tilting and dumping of the loads of particulate material of the dump basket; a drop chute extension swingably connected to the dump basket by hinges and extending along the upper edge of the dump side wall; and a top arm and a bottom arm extending between the basket and the chute extension for causing the swinging of the chute extension about the hinges and retraction and extension of the chute extension relative to the dump basket.

3 Claims, 6 Drawing Sheets

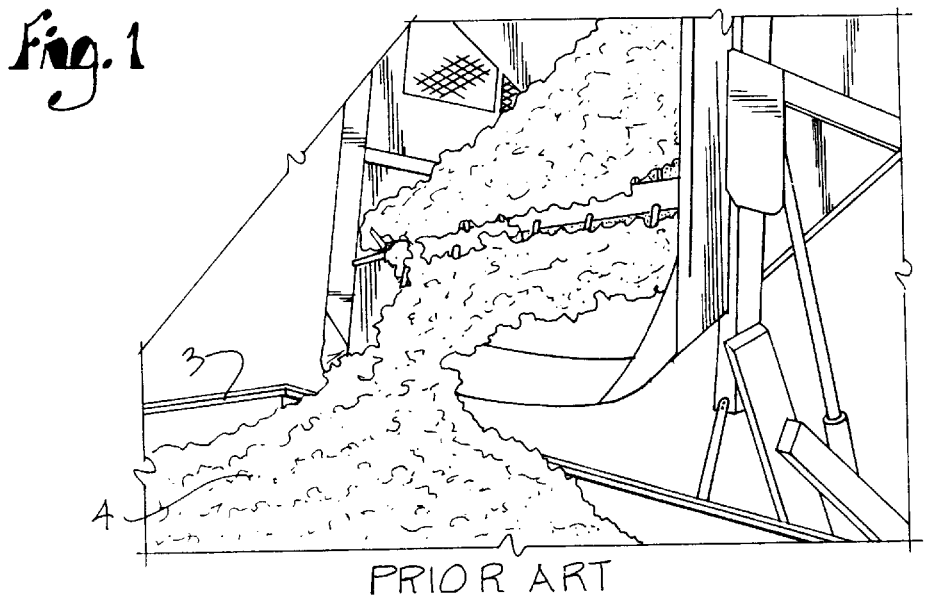
Fig. 1 PRIOR ART
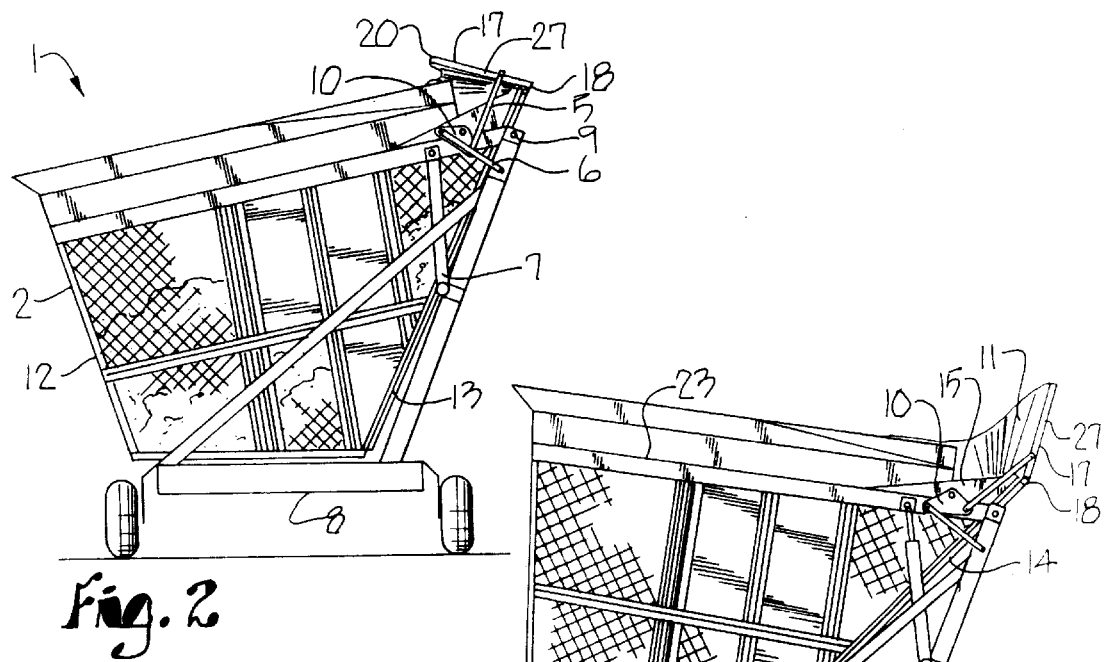
Fig. 2
Fig. 3

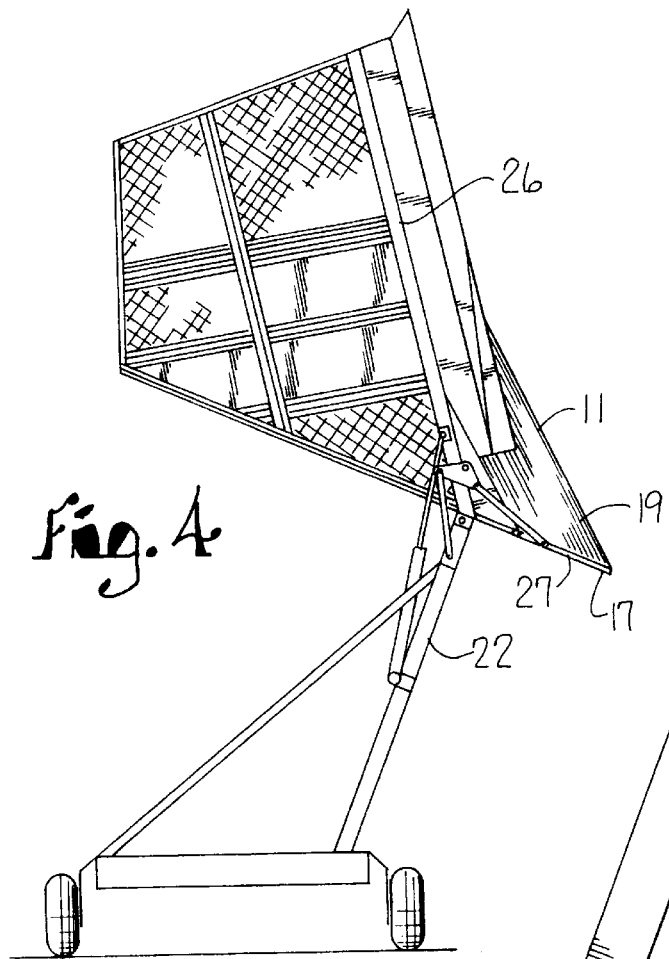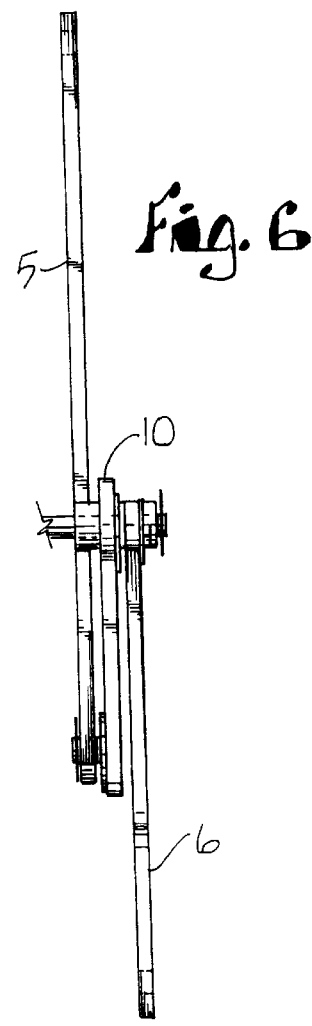

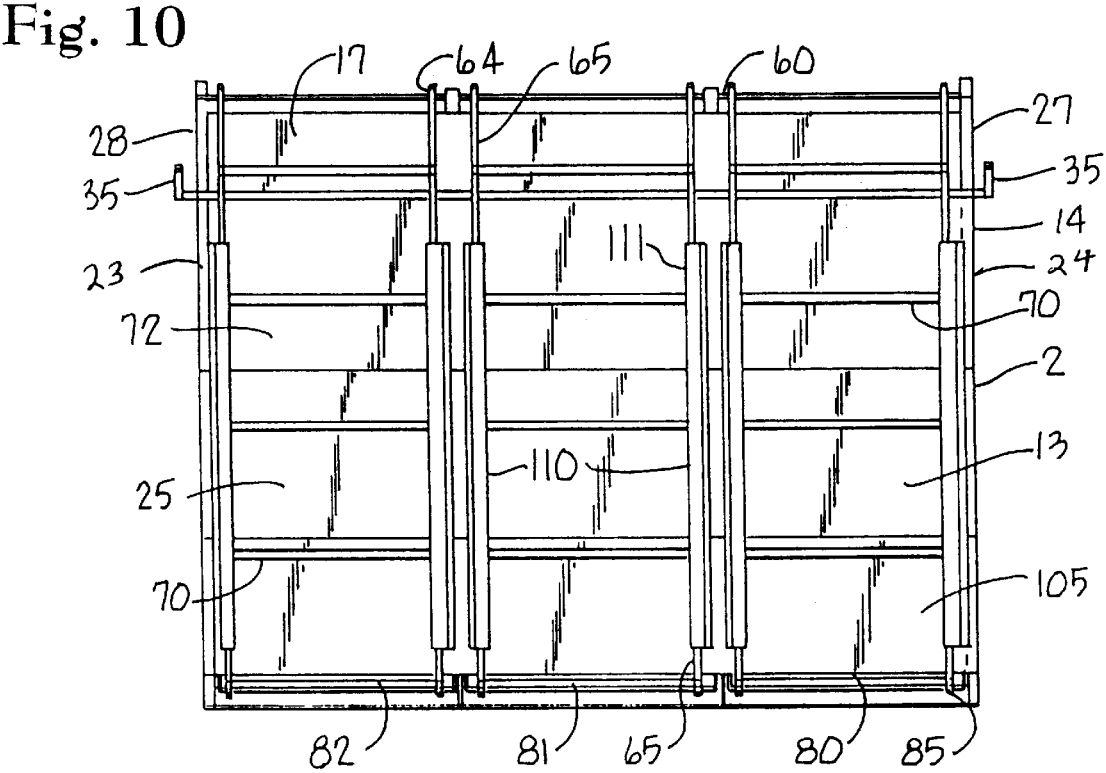

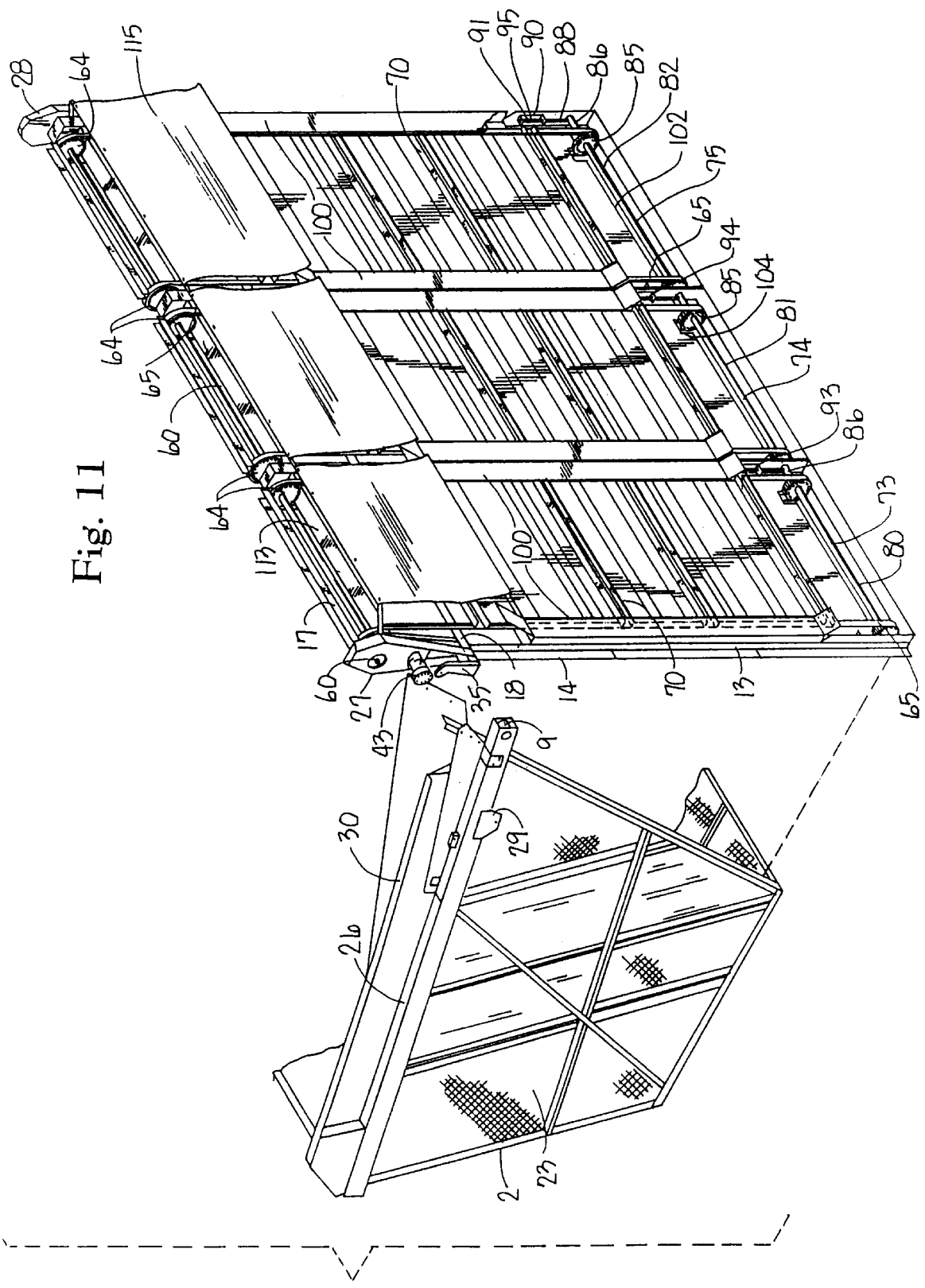

FOLD-OUT CHUTE EXTENSION FOR A SHUTTLE DUMPING TRANSPORT VEHICLE FOR HARVESTED COTTON

FIELD OF THE INVENTION

This invention relates to a fold-out chute extension for a shuttle dumping transport vehicle for harvested cotton.

BACKGROUND OF THE INVENTION

Shuttle dumping transport vehicles for harvested cotton are currently used in the market. These vehicles include chain driven conveyor belts for unloading harvested cotton. The vehicles must be positioned closely to the module builder or trailer wagon for proper unloading of the cotton into the module builder or trailer. Many dumping vehicles, however, have wide baskets or holding containers that make it difficult for the operator to easily position the vehicle beside a module builder or trailer for unloading. Hornung U.S. Pat. No. 5,380,142, owned by the assignee of this application, teaches a solution to this problem by employing a hydraulically activated drop chute extension connected to the dumping wall side of the vehicle.

The present invention provides a mechanically activated fold-out door or chute connected to the dumping wall side of the vehicle. The fold-out chute is simpler and more efficient than the prior art in that it does not employ hydraulic cylinders and automatically folds out as the basket is lifted, thereby directing the outward flow of cotton in the middle and far side of the module builder on the trailer. Similarly, it automatically retracts as the basket is lowered.

SUMMARY OF THE INVENTION

The present invention comprises a fold-out chute having a unique mechanical fold-out linkage that automatically activates when the basket begins to raise and fully extends upon lifting of the basket. The principal objects of the present invention are: (a) to provide an extendable and retractable drop chute extension for a shuttle dumping transport vehicle for harvested cotton; (b) to provide a fold-out drop chute or door extension that automatically extends and retracts upon the raising or lowering of the basket; (c) to provide such a drop chute extension that extends the length of a conveyor dump side wall for unloading cotton in the middle and far side of a modular builder or trailer; (d) to provide such a drop chute extension that can be folded over and down into the basket or loaded container thereby reducing both transport height and width of the shuttle dumping transport vehicle; and (e) to provide such a drop chute extension that will remain extended until the basket is again lowered by the lift cylinders of the vehicle.

Other objects and advantages of this invention will become apparent after considering the following disclosure.

BRIEF DESCRIPTION OF THE DRAWINGS

FIG. 1 is a fragmentary perspective view of a prior art raised basket dumping cotton out-of-center exposing the cotton to spillage.

FIG. 2 is a side elevational view of a shuttle dumping transport vehicle for harvested cotton bolls and with a fold-out drop chute extension embodying the present invention in the fully retracted position.

FIG. 3 is a side elevational view of the partially raised basket of the vehicle wherein the fold-out drop chute extension is in a partially extended position.

FIG. 4 is a side elevational view of the fully raised basket of the vehicle wherein the fold-out drop chute extension is in a fully extended position.

FIG. 5 is an enlarged disassembled side view of the fold-out linkage when the chute extension is in the fully retracted position.

FIG. 6 is an enlarged disassembled frontal view of the fold-out linkage when the chute extension is in the fully retracted position.

FIG. 10 is a fragmentary elevational view showing a vehicle drop out side wall and conveyor arrangement from the interior of the vehicle basket.

FIG. 11 is a disassembled perspective view of the vehicle conveyor belt with the drop chute extension in the extended position.

DETAILED DESCRIPTION OF PREFERRED EMBODIMENT

Figure 7:
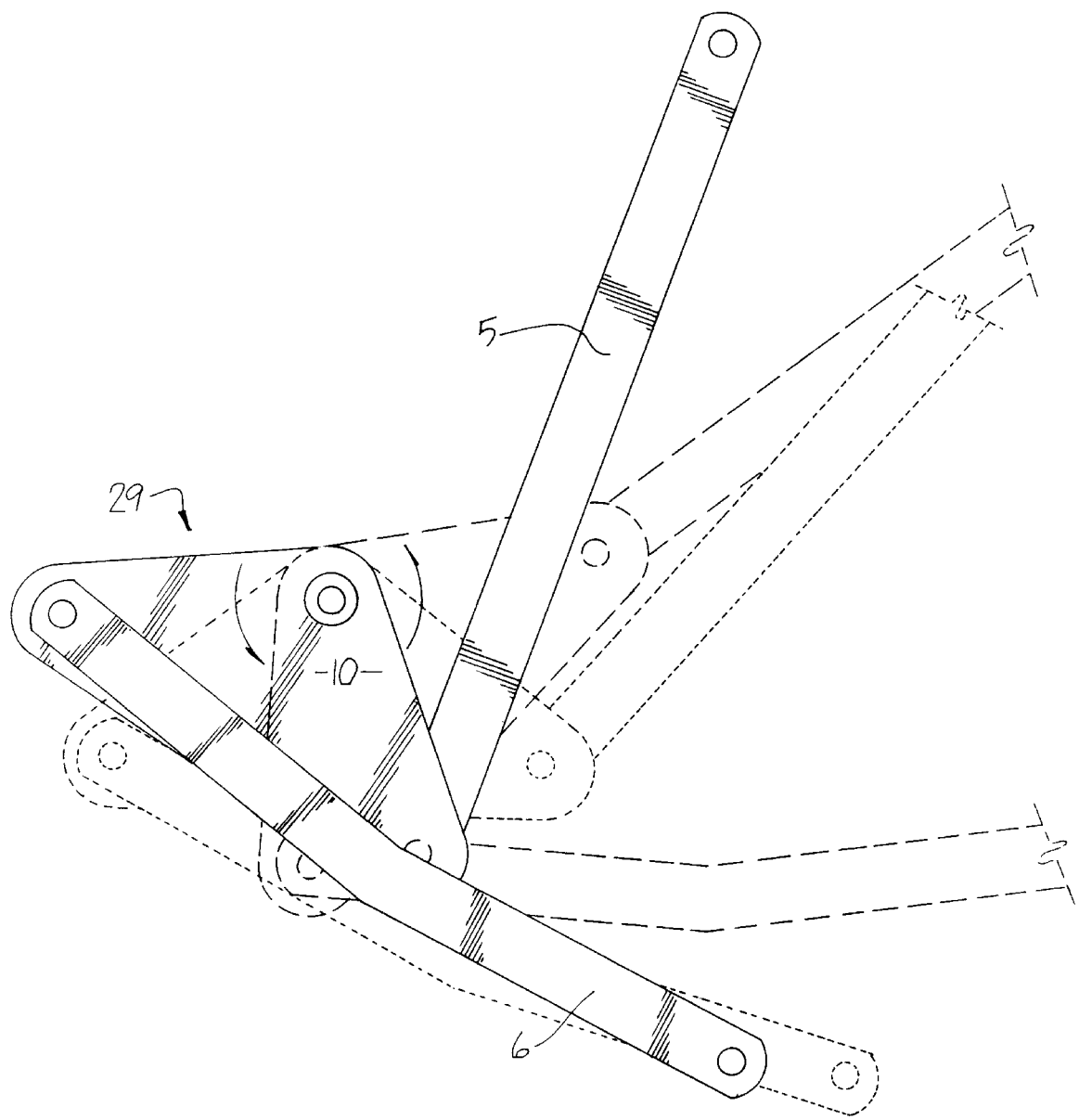
FIG. 7 is an enlarged disassembled side view of the fold-out linkage illustrating its movement with directional arrows and phantom lines.

As required, a detailed embodiment of the present invention is disclosed herein. It is, however, to be understood that the disclosed embodiment is merely illustrative of the invention, which may be embodied in various forms. Thus, specific structural and functional details disclosed herein are not to be interpreted as limiting, but merely as providing the proper basis for the claims and as a representative basis for teaching one skilled in the art to employ the drop chute extension for unloading a shuttle dumping transport vehicle for harvested cotton. FIG. 1 illustrates the prior art configuration and the out-of-center deposition of cotton into the trailer 3.

The reference numeral 1, FIG. 2, is generally directed to a shuttle dumping transport vehicle having a basket 2 that is positioned adjacent a module builder or trailer 3, as shown in FIG. 1. The vehicle 1 is similar to the vehicle disclosed in U.S. Pat. Nos. 4,458,588 and 5,380,142, incorporated herein by reference and which are commonly owned by the assignee of this application. The basket 2 holds cotton bolls 4 (FIG. 1) that are to be unloaded in the module builder or trailer 3. The vehicle 1 has hydraulic lift cylinders 7, a transport base 8, an upper pivot connection 9, a dump in end wall 12, a dump out end wall 13 having an upper unloading end 14, and a drop chute extension 17. The hydraulic lift cylinders 7 lift the basket 2 about the pivot connection 9, thereby swinging the basket 2 up and away from the transport base 8, FIG. 2. The drop chute extension 17 is connected to the upper unloading end 14 of the dump out end wall 13 at an extension pivot joint 18, FIGS. 2, 3, and 4. When the drop chute extension 17 is completely extended, it is in an unloading position 19. The drop chute extension 17 when fully retracted, is in a towing position 20 and is stowed back into the basket 2, FIG. 2.

The basket 2 has first and second opposite side walls 23 and 24, respectively. The hydraulic lift cylinders 7 are secured to the transport base 8 on either side and adjacent to the first and second opposite side walls 23 and 24. The drop chute extension 17 extends substantially between the first and second opposite side walls 23 and 24.

FIG. 4 discloses the vehicle 1 having the basket 2 lifted away from the transport base 8 by the hydraulic lift cylinders 7. The drop chute extension 17 is in the unloading position 19 for unloading cotton bolls 4 out of the basket 2 into the module builder or trailer 3. When the drop chute extension is in the unloading position 19 and the basket 2 is adjacent to and not lifted away from the transport base 8, the height from the ground to the top of the exemplary drop chute extension 17 is approximately 17 feet. The height from the ground to the extension pivot joint 18, when the drop chute extension 17 is in the towing position 20, is approximately 14 feet. The drop chute extension 17 has an approximate length of four feet ten inches. With the use of the drop chute extension 17, a conveyor floor 25 is extended, which unloads the cotton bolls 4 into the middle and far side of the module builder or trailer 3. The drop chute extension 17, when folded over and into the basket 2 of the vehicle 1, reduces both the transport height and width of the vehicle 1.

Referring to FIG. 3, a side elevational view of the partially raised basket of the vehicle is shown with the drop chute extension 17 about half-way between the towing and unloading positions 20 and 19, respectively. The basket 2 has brackets 15 securely fastened to upper ends or horizontal frame members 26 of the first and second side walls 23 and 24. The upper ends 26 also join extension walls 30 that extend substantially along the length of the first and second side walls 23 and 24 and which are mounted adjacent to the bracket 15 to provide additional loading capacity. The drop chute extension 17 has first and second opposite extension arms 27 and 28 that are connected to the first and second opposite side walls 23 and 24 of the basket 2 at the pivots 18. The drop chute extension 17 also has side guards 11 extending from extension arms 27 of the drop chute extension 17 to the top end of the extension walls 30 and which serve to keep the cotton bolls 4 from spilling out over the sides. Side guards 11 are preferably made of rubber or other suitably flexible material.

Figure 8:
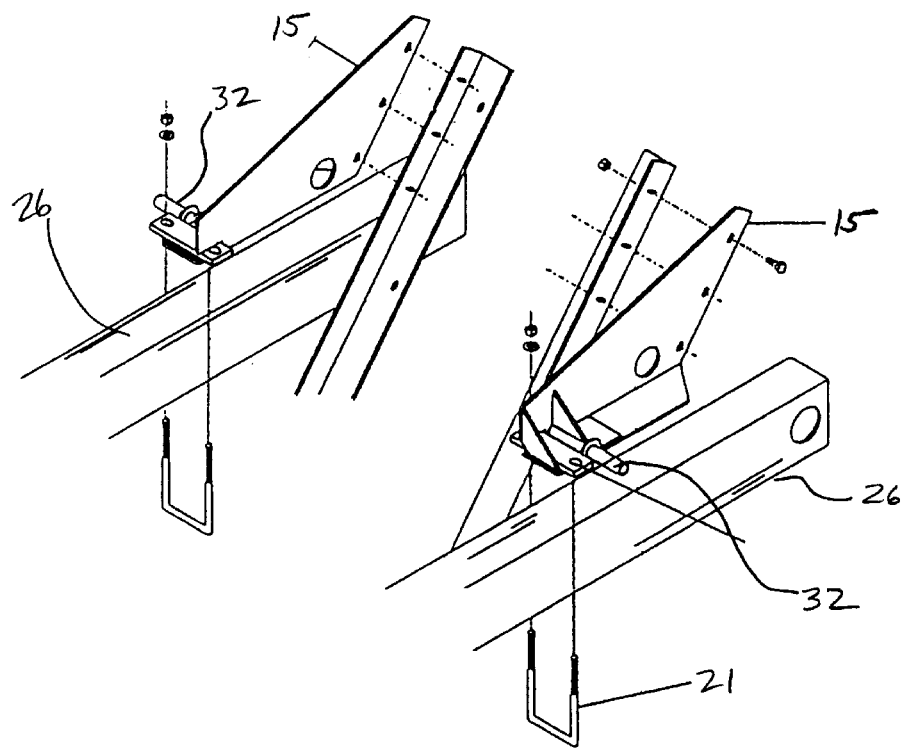
FIG. 8 is fragmentary perspective view of the bracket configurations connecting to the horizontal frame members on each side of the basket.
Figure 9:
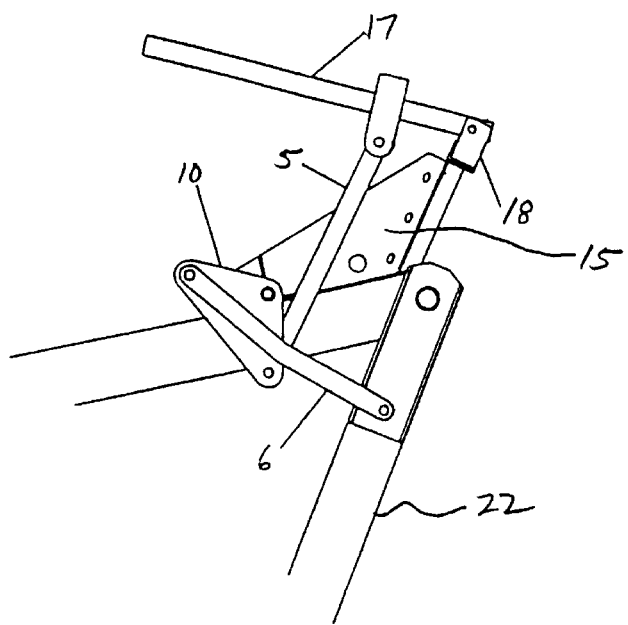
FIG. 9 is a fragmentary side elevational view of the fold-out linkage and bracket configuration when the chute extension is in the retracted position.

Referring to FIG. 8, brackets 15 are securely fastened to each of the upper ends or horizontal frame members 26 preferably with U-bolts 21 or other suitable fastening means. Brackets 15 are also affixed with screws to extension arms 27. The triangular fold-out linkage arrangements, 29 are then affixed to brackets 15 and each comprise pivot plate 10, top arm 5 and lower arm 6. Pivot plate 15 is triangularly shaped and has three apertures 31 at approximately each point of the triangle. Preferably one of the apertures 31 mates with post 32 of bracket 15, bracket 15 being held in place by washers and a cotter pin or other equivalent means. Another embodiment is to directly connect pivot plate 10 to upper ends 26 using post and cotter pin fasteners. Top arm 5 and lower arm 6 are affixed to pivot plate 10 via the remaining two apertures 31 using conventional post and cotter pin configurations or other like means. In any event, pivot plate 10, top arm 5 and lower arm 6 are free to rotate or pivot upon the raising or lowering of the basket 2. The free ends of top arm 5 are connected by post and cotter pin fasteners to the arms 27 of drop chute extension 17 and the free ends of lower arm 6 are likewise connected to the vertical frame members 22. Lower arm 6 is preferably angled as shown in FIG. 7.

Referring to FIGS. 3, 4 and 7, when the operator of the vehicle 1 energizes the primary hydraulic system of the tractor (not shown) to lift the basket 2 from the transport base 8, the hydraulic fluid then travels through hydraulic lift cylinders 7 and causes the lift cylinders 7 to raise the basket 2 from the transport base 8. Upon the lift of the basket 2, the triangular fold-out linkages 29 automatically activate whereby on each side the lower arm 6 forces the rotation of the pivot plate 10 and the upward movement of the top arm 5 which in turn forces the chute extension 17 to bend at pivot joint 18 and open to the extended or unloading position 19 upon the complete elevation of the basket 2. When the basket 2 is thereafter lowered, the length of the lower arm 6 forces the opposite rotation of pivot plate 10, the opposite bend at pivot joint 18 and the downward movement of the top arm 5 which in turn forces the chute extension 17 to a retracted or towing position 20.

The interior surface, FIG. 10, of the dump out end wall 13 is formed of a plurality of plates 72, such as formed of sheet metal, and which present a smooth surface for the movement of the cotton bolls 4 across it. The conveyor chains 65 with their attached sweeper bars 70 are moved across the plates 72 to sweep the cotton bolls out of the basket 2 and into the transport trailer 3. In the illustrated example, the conveyor chains 65 circulate about the driven top shaft 60 and idler or non-driven bottom shafts 73, 74 and 75, with a like number of chain sprockets 64. There are a total of six conveyor chains 65 which combine to comprise three conveyor sets 80, 81, and 82, with each set having a plurality of sweeper bars 70.

In the illustrated example, each conveyor set 80, 81 and 82 has a single associated idler bottom shaft arrangement 73, 74, and 75, with each arrangement including a shaft 73, 74 or 75 with opposite bottom end sprockets 85. The shaft has opposite ends supported in bearings 86 which are mounted on downwardly extending rods 88. The rods are spring biased to an extended position by a mounting bracket 90 and spring 91 arrangement attached to a back side of the end wall 13. Each idler bottom shaft arrangement 73, 74, and 75 is biase extended to tension the chains 65. On the wall 13 back side, FIG. 11, the chains 65 travel in rear guide sets 100, which are substantially C shaped sections with confronting openings and between which the sweeper bars 70 extend. There are two guide sets 100 for each conveyor set 80, 81, and 82. Adjacent a bottom edge 102 of the end wall 13, the chains 65 travel through passages 104 in the plates 72 for return over an inside surface 105 of the end wall 13, FIG. 10. There are also front guide sets 110, which include wear strips for chain travel and confronting channel members 11 1. The front guide sets terminate at an upper portion of the dump out end wall 13 and prior to the chute extension 17. The front and rear guide sets 100 and 110 serve to alleviate fouling of the chain 65 and prevent undue sagging when the chute extension 17 is folded, although some sag is accommodated by the outwardly biased idler bottom shafts 73, 74, and 75. Other means for forcing the cotton bolls 4 out of the basket 2 may be employed such as a large spindle (not shown) placed near the dump out end wall 13 and having projections thereon to force the bolls 4 out of the basket 2 as the spindle turns.

To prevent excessive spillage of the cotton bolls as they are unloaded by being conveyed by the sweeper bars 70 and outwardly over a lip 113 of the drop chute extension 17, flaps 115, such as of heavy, rubberized fabric belting material are attached, as by fasteners to the lip 113 so that they hang down toward the module builder or trailer. The flaps 115 additionally serve a guard or cover function to shield portions of moving machinery.

To review the operation and use of the drop chute extension 17, the operator of the tractor (not shown) positions the vehicle 1 adjacent to a module builder or trailer 3 such that the basket 2 is parallel to the module builder or trailer 3. The operator then actuates controls to the primary hydraulic system that operates the lift cylinders 7. Upon lifting of the basket 2, the triangular fold-out linkage 29 activates to open the chute extension 17 from the towing position 20 the unloading position 19. The operator then activates the conveyor or other similar means to propel the cotton bolls 4 out of the basket 2 and into the middle and far areas of the module builder or trailer 3.

It is to be understood that while certain forms of this invention have been illustrated and described, the invention is not limited to the specific forms or arrangement of parts described thereto, except insofar as such limitations are included in the following claims.

What is claimed and desired to be secured by Letters Patent is as follows:

1. A vehicle for transporting and dumping loads of particulate material comprising:
   a. a vehicle frame having spaced, ground engaging wheels extending therefrom, and angularly upstanding spaced frame members projecting upward from said vehicle frame;
   b. a dump basket operative to contain said loads of particulate material therein, said dump basket situated between said spaced frame members and having spaced end walls, a first side wall, and a dump side wall, said spaced end walls, said first side wall and said dump side walls each having respective upper edges, the respective junctures of said upper edges forming spaced, upper corners, said dump basket having hinge connections to said frame members at said upper corners of said upper edges of said end walls and said dump side wall for upward rotation, tilting and dumping of said loads of particulate material of said dump basket;
   c. a drop chute extension swingably connected to said dump basket by hinges and extending along said upper edge of said dump side wall;
   d. a triangular fold-out linkage connected generally to horizontal frame members along each of said end walls of said dump basket, said linkages for causing the swinging of said chute extension about said hinges and retraction and extension of said chute extension relative to the dump basket; and
   e. a conveyor moveable over a basket interior surface of said dump side wall and said chute extension for engaging and transporting said load out of said dump basket.

2. A vehicle for transporting and dumping loads of particulate material comprising:
   a. a vehicle frame having spaced, ground engaging wheels extending therefrom, and angularly upstanding spaced frame members projecting upward from said vehicle frame;
   b. a dump basket operative to contain said loads of particulate material therein, said dump basket situated between said spaced frame members and having spaced end walls, a first side wall, and a dump side wall, said spaced end walls, said first side wall and said dump side walls each having respective upper edges, the respective junctures of said upper edges forming spaced, upper corners, said dump basket having hinge connections to said frame members at said upper corners of said upper edges of said end walls and said dump side wall for upward rotation, tilting and dumping of said loads of particulate material of said dump basket;
   c. a drop chute extension swingably connected to said dump basket by hinges and extending along said upper edge of said dump side wall; and
   d. a top arm and a bottom arm extending between said basket and said chute extension for causing the swinging of said chute extension about said hinges and retraction and extension of said chute extension relative to the dump basket;
   e. said top arm being affixed at a first end to the chute extension and at a second end to a pivot plate;
   f. said lower arm being affixed at an upper end to the pivot plate and at a lower end to a post of the vehicle;
   g. said pivot plate being affixed to a horizontal frame member; and
   h. said pivot plate being affixed to said horizontal frame member with a bracket, said bracket mounted to said horizontal frame member and having a post that detachably mates with an aperture of said pivot plate to hold said pivot plate in place on said horizontal frame member with means for affixure.

3. A vehicle for transporting and dumping loads of particulate material comprising:
   a. a vehicle frame having spaced, ground engaging wheels extending therefrom, and angularly upstanding spaced frame members projecting upward from said vehicle frame;
   b. a dump basket operative to contain said loads of particulate material therein, said dump basket situated between said spaced frame members and having spaced end walls, a first side wall, and a dump side wall, said spaced end walls, said first side wall and said dump side walls each having respective upper edges, the respective junctures of said upper edges forming spaced, upper corners, said dump basket having hinge connections to said frame members at said upper corners of said upper edges of said end walls and said dump side wall for upward rotation, tilting and dumping of said loads of particulate material of said dump basket;
   c. extensible motive means between said frame and said dump basket to upwardly lift and tilt said basket less than 90° from a vertical plane;
   d. a drop chute extension door swingably connected to said dump basket by hinges and extending along said upper edge of said dump side wall; and
   e. a triangular fold-out linkage member pivotally connected to generally horizontal frame members along each of said end walls of said dump basket and having link arms respectively extending between said frame members and said linkage member and said chute extension door and said linkage member, said linkage member rotating as said basket is raised and tilted to swing said chute extension door open outwardly to form a platform extending beyond a vehicle frame wheel generally thereunder.

\* \* \* \* \*